United States Patent
Androulaki et al.

(10) Patent No.: US 10,230,756 B2
(45) Date of Patent: Mar. 12, 2019

(54) RESISTING REPLAY ATTACKS EFFICIENTLY IN A PERMISSIONED AND PRIVACY-PRESERVING BLOCKCHAIN NETWORK

(71) Applicant: International Business Machines Corporation, Armonk, NY (US)

(72) Inventors: Elli Androulaki, Zurich (CH); Angelo De Caro, Zurich (CH); Thorsten Kramp, Jona (CH); David W. Kravitz, San Jose, CA (US); Alessandro Sorniotti, Zurich (CH); Marko Vukolic, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 15/331,385

(22) Filed: Oct. 21, 2016

(65) Prior Publication Data

US 2017/0149819 A1 May 25, 2017

Related U.S. Application Data

(60) Provisional application No. 62/259,662, filed on Nov. 25, 2015.

(51) Int. Cl.
  *G06F 11/00* (2006.01)
  *H04L 29/06* (2006.01)
  (Continued)

(52) U.S. Cl.
  CPC ........ *H04L 63/1441* (2013.01); *G06F 21/606* (2013.01); *G06F 21/6245* (2013.01);
  (Continued)

(58) Field of Classification Search
  CPC ............... H04L 63/1441; H04L 63/123; H04L 63/0823; H04L 63/1416; H04L 63/04; G06F 21/6245
  (Continued)

(56) References Cited

U.S. PATENT DOCUMENTS

| 8,959,346 B2 | 2/2015 | Agrawal |
| 9,071,416 B2 | 6/2015 | Liu et al. |

(Continued)

FOREIGN PATENT DOCUMENTS

| WO | 2015171580 A1 | 11/2015 |
| WO | 2016019086 A1 | 2/2016 |

OTHER PUBLICATIONS

Ahmed et al., "Critical analysis of counter mode with cipher block chain message authentication mode protocol—CCMP", Security Comm. Networks, vol. 7, Issue 2, 2014, pp. 293-308.

(Continued)

*Primary Examiner* — Mohammad W Reza
(74) *Attorney, Agent, or Firm* — Cantor Colburn LLP; Daniel Morris (57) ABSTRACT

Embodiments of the present invention may provide techniques by which replay attacks in a blockchain network may be efficiently resisted, while preserving valid user permissions and privacy in the blockchain network. For example, in an embodiment of the present invention, in a network of computer systems, a method of communication may comprise at a user computer system, generating a security value that is to be used only once, generating a message signed with a security certificate and including the security value, and transmitting the message over the network of computer systems.

24 Claims, 10 Drawing Sheets

(51) Int. Cl.
    *G06F 21/62* (2013.01)
    *G06F 21/60* (2013.01)
    *G06F 21/64* (2013.01)
    *H04L 9/32* (2006.01)

(52) U.S. Cl.
    CPC ............ *G06F 21/64* (2013.01); *H04L 9/3236* (2013.01); *H04L 63/04* (2013.01); *H04L 63/0823* (2013.01); *H04L 63/123* (2013.01); *H04L 63/1416* (2013.01); *H04L 2209/38* (2013.01); *H04L 2209/56* (2013.01)

(58) Field of Classification Search
    USPC .......................................................... 726/23
    See application file for complete search history.

(56) References Cited

U.S. PATENT DOCUMENTS

| | | | |
|---|---|---|---|
| 9,100,193 B2 | 8/2015 | Newsome et al. | |
| 2007/0118769 A1* | 5/2007 | England ................ | G06F 9/4406 713/193 |
| 2009/0217043 A1* | 8/2009 | Metke ................... | G06F 21/445 713/171 |
| 2012/0284524 A1 | 11/2012 | Ho | |

OTHER PUBLICATIONS

Malhotra et al., "Attacking the Network Time Protocol", ePrint (Cryptology) Report (2015/1020), Oct. 21, 2015, 18 pages, http://www.cs.bu.edu/~goldbe/papers/NTPattack.pdf.

* cited by examiner

Valuator response to a deployment transaction

Fig. 7  Invocation Transaction

Fig. 9

Validator response to an invocation transaction

Fig. 10

RESISTING REPLAY ATTACKS EFFICIENTLY IN A PERMISSIONED AND PRIVACY-PRESERVING BLOCKCHAIN NETWORK

DOMESTIC PRIORITY

This application claims the benefit of U.S. Provisional Application No. 62/259,662 filed Nov. 25, 2015, which is hereby incorporated by reference in its entirety.

BACKGROUND

The present disclosure relates to network security, and to attack protection through validation of transactions.

A transaction ledger is a concept that was introduced in the context of decentralized payment systems, such as BITCOIN®, to denote an ordered set of transactions that have been validated or confirmed within the system up to a certain point in time. A transaction ledger may include a continuously-growing list of data records, where each data record may include data relating to one transaction. Further, encryption and other security measures may be used to secure the transaction ledger from tampering and revision.

A blockchain is a distributed database that may be used to maintain a transaction ledger. A blockchain may include a number of blocks, each block holding one or more of individual transactions or data records. Further, each block may contain a timestamp and a link to a previous block. In a typical blockchain network, users may be allowed to connect to the network, send new transactions to it, verify transactions, and create new blocks. However, a problem arises with replay attacks compromising the security of such a blockchain network. In a replay attack the attacker simply "replays" a message that was "eavesdropped" on from the network or that the attacker "saw" on the Blockchain. Such a replay would cause the blockchain validators to include this new transaction in the Blockchain, and thus repeat the result of that transaction without the original creator of the transaction intending this. This may be a problem, especially for actual payment systems. Accordingly, a need arises for techniques by which such replay attacks may be efficiently resisted, while preserving valid user permissions and privacy in the blockchain network.

SUMMARY

Embodiments of the present invention may provide techniques by which replay attacks in a blockchain network may be efficiently resisted, while preserving valid user permissions and privacy in the blockchain network.

For example, in an embodiment of the present invention, in a network of computer systems, a method of communication may comprise at a user computer system, generating a security value that is to be used only once, generating a message signed with a security certificate and including the security value, and transmitting the message over the network of computer systems.

For example, in an embodiment, the security certificate may include information identifying the user computer system and the security value may be generated as a function of a security value included in a previous message. The function used to generate the security value may be selected from a group including a counter function, a hash function, and a random function. The message may further comprise computer program instructions to be executed to perform at least one function relating to a digital transaction and the method may further comprise at a validator computer system, executing the digital transaction by executing the computer program instructions to perform the at least one function relating to the digital transaction and storing information relating to the executed digital transaction in an order in which the digital transactions were performed. The information relating to the executed digital transaction may comprise a security value included in a digital transaction for each of a plurality of user systems. The security certificate may not include information identifying the user computer system, the security certificate may have a validity period, and the security value may be generated as a random function. The message may further comprise computer program instructions to be executed to perform at least one function relating to a digital transaction and the method may further comprise at a validator computer system, executing the digital transaction by executing the computer program instructions to perform the at least one function relating to the digital transaction and storing information relating to the executed digital transaction including a hash of the security value. The method may further comprise resetting the hash of the security value upon expiration of the validity period of the security certificate.

For example, in an embodiment of the present invention, a network of computer systems comprising a plurality of computer systems, each computer system comprising a processor, memory accessible by the processor, and computer program instructions stored in the memory, a first computer system comprising computer program instructions executable by the processor to perform generating a security value that is to be used only once, generating a message signed with a security certificate and including the security value, and transmitting the message over the network of computer systems.

For example, in an embodiment, the security certificate may include information identifying the user computer system and the security value may be generated as a function of a security value included in a previous message. The function used to generate the security value may be selected from a group including a counter function, a hash function, and a random function. The message may further comprise computer program instructions to be executed to perform at least one function relating to a digital transaction and a second computer system may comprise computer program instructions executable by the processor to perform executing the digital transaction by executing the computer program instructions to perform the at least one function relating to the digital transaction and storing information relating to the executed digital transaction in an order in which the digital transactions were performed. The information relating to the executed digital transaction comprises a security value included in a digital transaction for each of a plurality of user systems. The security certificate may not include information identifying the user computer system, the security certificate may have a validity period, and the security value may be generated as a random function. The message may further comprise computer program instructions to be executed to perform at least one function relating to a digital transaction and a second computer system may comprise computer program instructions executable by the processor to perform executing the digital transaction by executing the computer program instructions to perform the at least one function relating to the digital transaction and storing information relating to the executed digital transaction including a hash of the security value. The network of computer systems may further comprise resetting the hash of the security value upon expiration of the validity period of the security certificate.

For example, in an embodiment of the present invention, a computer program product for communicating in a network of computer systems, the computer program product comprising a computer readable medium and computer program instructions stored on the computer readable medium and executable by a processor to perform generating a security value that is to be used only once, generating a message signed with a security certificate and including the security value, and transmitting the message over the network of computer systems.

For example, in an embodiment, the security certificate may include information identifying the user computer system and the security value may be generated as a function of a security value included in a previous message. The function used to generate the security value may be selected from a group including a counter function, a hash function, and a random function. The message may further comprise computer program instructions to be executed to perform at least one function relating to a digital transaction and the computer program product may further comprise computer program instructions to perform executing the digital transaction by executing the computer program instructions to perform the at least one function relating to the digital transaction and storing information relating to the executed digital transaction in an order in which the digital transactions were performed. The information relating to the executed digital transaction may comprise a security value included in a digital transaction for each of a plurality of user systems. The security certificate may not include information identifying the user computer system, the security certificate may have a validity period, and the security value may be generated as a random function. The message may further comprise computer program instructions to be executed to perform at least one function relating to a digital transaction and the computer program product may further comprise computer program instructions to perform at a validator computer system, executing the digital transaction by executing the computer program instructions to perform the at least one function relating to the digital transaction and storing information relating to the executed digital transaction including a hash of the security value. The computer program product may further comprise computer program instructions to perform resetting the hash of the security value upon expiration of the validity period of the security certificate.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
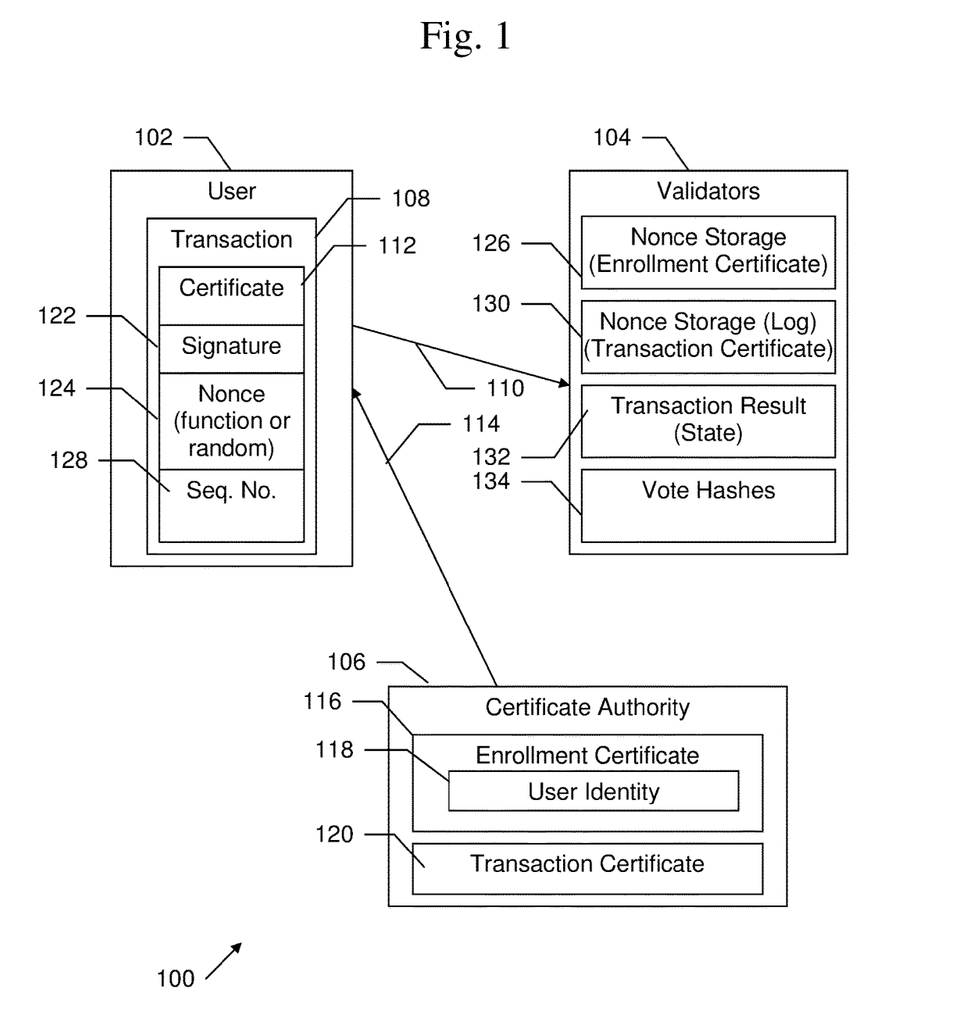
FIG. 1 is a block diagram of a system in which some exemplary embodiments of the disclosed subject matter may be implemented.

Turning now to the figures, FIG. 1 illustrates a system 100 in which embodiments of the present invention may be implemented. For example, system 100 may include one or more users 102, one or more validators 104, and a certificate authority 106. The users 102, validators 104 and certificate authority 106, as illustrated, each may comprise one or more processing elements, such as processors, servers, and so forth. Furthermore, the systems 100 and each of the aforementioned elements may be adapted to perform the methods as shown in the figures and all their steps.

In an embodiment, the system 100 can be a Blockchain network 100 that can include user computer systems (users) 102 submitting transactions, and validator computer systems (validators) 104 executing and validating transactions. Transactions 108 submitted 110 by users 104 may be signed by a client certificate 112, which may be anonymous or which may include that client's identity. These certificates may be managed by an identity management infrastructure including certificate authority computer systems (certificate authority) 106, which may issue 114 user long term certificates that carry these user identities 118, such as enrollment certificates 116, and privacy-preserving certificates, such as transaction certificates 120, that are not linked to their owner's identity. Accordingly, for any particular transaction, certificate 112 may be an enrollment certificate 116, which includes user identity 118, or transaction certificate 120, which is anonymous. Transactions may be signed by a secret key corresponding to either type of certificate to accommodate user transactional privacy. A verification key may be extracted from the certificate 112, which may be used to verify the signature 122. Typically, there is a consensus protocol in place such that transactions are totally ordered, or ordered in blocks, before they are executed/validated. Further, a user 102 may include a nonce 124 in the transaction. A nonce is an arbitrary number that may only be used once. A nonce is typically a random or pseudo-random number issued in an authentication protocol to ensure that old communications cannot be reused in replay attacks. In the case where the user 102 signs the transaction with their enrollment certificate 118, the nonce 124 may be a function of the nonce that they used in the previous transaction. The nonce 124 may be, for example, a counter function or a hash, etc. The first number registered as a nonce for a user may also be random. In the case where the user 102 signs the transaction with a transaction certificate 120, the nonce 124 may be random.

Figure 2:
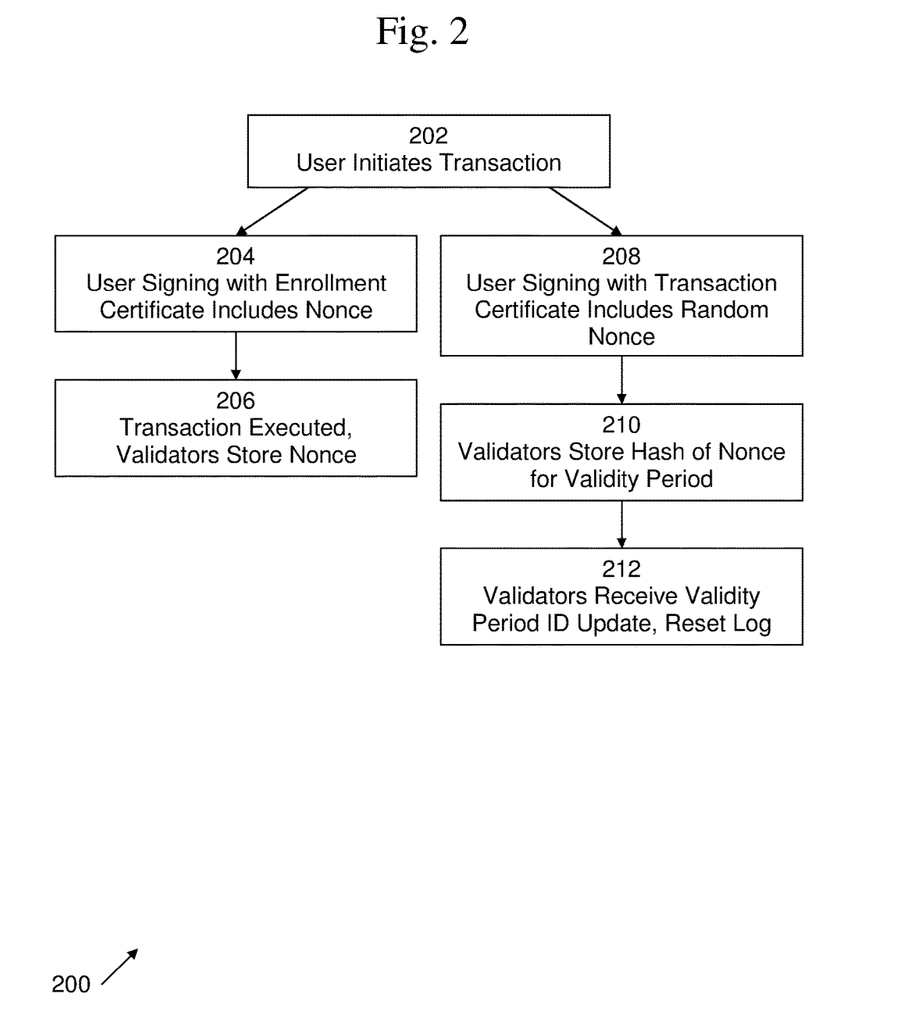
FIG. 2 is a flow diagram of a process in accordance with some exemplary embodiments of the disclosed subject matter.

FIG. 2 is a flowchart diagramming a process 200, in accordance with some exemplary embodiments of the disclosed subject matter. Those skilled in the art will appreciate the method illustrated by the flowchart of FIG. 2 is merely exemplary and that alternate variations may be employed, all in accordance with the present technique. FIG. 2 is best viewed in conjunction with FIG. 1. In an exemplary embodiment, a hybrid approach may be used, whereby users 102 may add in the transaction a nonce that is generated in a different manner depending on whether the transaction is anonymous (signed by a transaction certificate 120) or not (signed by a long term enrollment certificate 118).

Process 200 begins with 202, in which a user 102 initiates a transaction 108. At 204 a user signing with their enrollment certificate 118 may include a nonce 124 in the transaction that is a function of the nonce they used in the previous transaction. At 206, when the transaction is executed, validators 104 store 126 the nonce of the current transaction 108 they parse, as long as it is a function of the previous nonce. When the transaction is executed and added to the Blockchain, the transactions are ordered, making this easy to check. Accordingly, at the user 102 only the most recently used nonce need be stored, while at the validator 104, the storage 126 needed is a function O(n), where n is the number of users.

At 208, a user 102 signing with a transaction certificate 120 should include in the transaction a random nonce 124, which may ensure that two transactions do not result in the same hash. At 210, validators 104 store 130 the hash of this transaction during the validity period of the current transaction certificate. Validity periods may expire every fixed time interval as scheduled by the underlying identity management infrastructure, through some signed system messages that the Certificate Authority 106 may advertise through the Blockchain. At 212, validators 104 may receive a message that updates the current validity period ID, then they may reset the log 130 of transaction hashes they have collected for replay attack protection, as replays of older (anonymous) messages would be using expired transaction certificates and would accordingly be excluded from the Blockchain. At the user 102, nothing need be stored, while at the validator 104, the storage 130 needed is a function O(m) of hash values, where m is the number of transactions per validity period.

Figure 3:
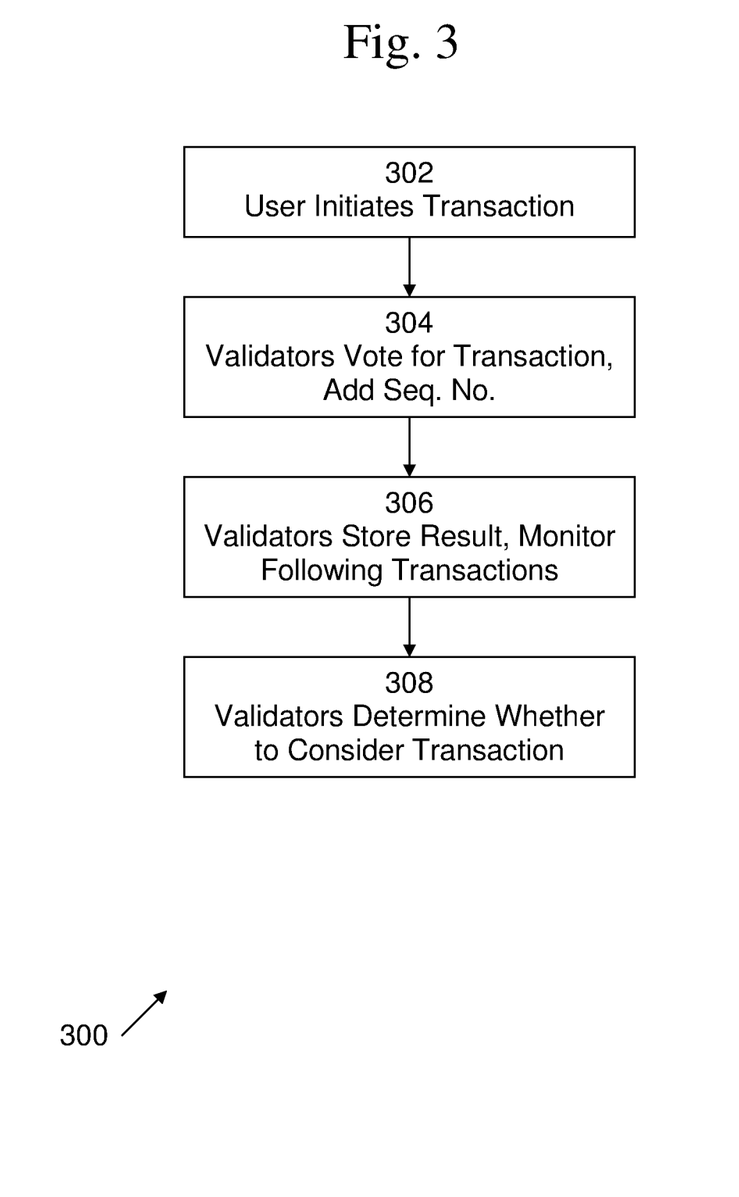
FIG. 3 is a flow diagram of a process in accordance with some exemplary embodiments of the disclosed subject matter.

FIG. 3 is a flowchart diagramming a process 300, in accordance with some exemplary embodiments of the disclosed subject matter. Those skilled in the art will appreciate the method illustrated by the flowchart of FIG. 3 is merely exemplary and that alternate variations may be employed, all in accordance with the present technique. FIG. 3 is best viewed in conjunction with FIG. 1. In an exemplary embodiment, some of the transactions that a user submits to the network may have confidentiality constraints with respect to which validators are able to execute the transaction. In order to reach consensus over the (encrypted) result of the confidentiality-constraint transactions, validators 104 that are included in the list of validators authorized to execute the transaction may submit through the blockchain their "signed vote" on the result.

Process 300 begins with 302, in which a user 102 may initiate a transaction 108 that may include confidentiality constraints with respect to which validators are able to execute the transaction. At 304, validators 104 vote for a transaction, and may add to the signed transaction a sequence number 128 of the transaction they vote for in the total order of transactions. For example, if the validator 104 vote corresponds to a confidential transaction with sequence number X, in the total order of transactions, the header of that transaction may include X, or a function of X, such as a hash, etc.

At 306, validators 104 may store an updated version of the confirmed result 132 of this transaction. To do this, validators 104 may store a state of the transaction, and further may monitor the following blocks of transactions, for example, T blocks, that may be confirmed. During this period hashes 134 of the advertised validator votes may be kept. Thus, at 308, upon receiving a confidential transaction vote from a validator, other validators may consider this transaction if and only if X is above the number of validator 104 responses they still consider, and may reject it otherwise. Because X is indicative of the order of the corresponding transactions, validators will be able to distinguish between 1) a vote that is outdated, for which the period for processing votes for that transaction has expired, or a vote that may be a replay of an older vote, and 2) a vote on a future transaction that has not yet been processed or is being processed which should be added to the Blockchain.

Figure 4:
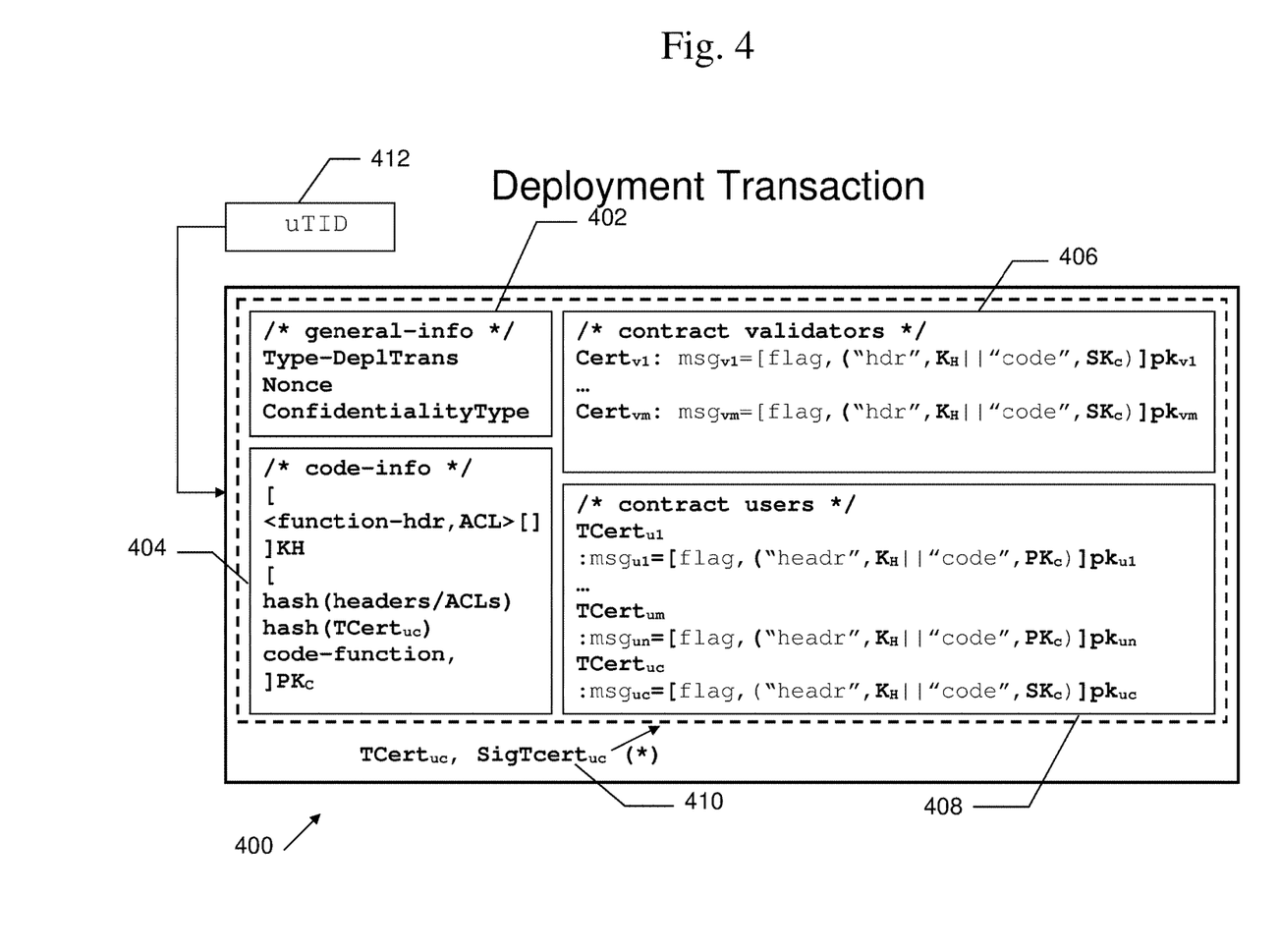
FIG. 4 is an exemplary format of a message that may be used by some exemplary embodiments of the disclosed subject matter.

In an exemplary embodiment, a chain-code may be created and submitted to a blockchain via a deployment transaction. An exemplary format of a deployment transaction 400 is shown in FIG. 4. In this example, deployment transaction 400 may include general information 402, code information 404, validator information 406, and user information 408. General information 402 may include a type of the deployment transaction, a confidentiality type, and a nonce. Code information 404 may include information on the code to be executed, and may include a number of code-functions. Validator information 406 may include information to be used by validators, such as validators 104, shown in FIG. 1. User information 408 may include information to be used by users, such as users 102, shown in FIG. 1.

In this example, $u_C$ may be the user who submitted the deployment transaction. A chain-code may include of a set of functions (function) and their headers (function-hdr). A chain-code function may be invoked via an invocation transaction. A user, $u_C$ may specify a set of validators, $v_1, \ldots, v_m$, which may be denoted by contract validators to execute the chain-code (invocations). Each function may be invoked by a set of users $u_1, \ldots, u_n$, which may be called contract users. Validator and user enrollment public keys may be accessible to everyone. Validators share with an auditor the key $K_{adt}$. In this example, $Cert_{ui}$ may denote the enrollment or transaction certificate of user $u_i$, having the associated keys denoted by $(pk_{ui}, sk_{ui})$, $TCert_{ui}$ may denote a transaction certificate of user $u_i$ having the associated keys denoted by $(tpk_{ui}, tsk_{ui})$, and $Cert_{vj}$ may denote the enrollment or transaction certificate of validator $v_j$ having the associated keys denoted by $(pk_{vj}, sk_{vj})$. For simplicity, the enrollment or transaction encryption/signing keys may be denoted with the same symbol.

In this exemplary deployment transaction, there may a common validation threshold for all confidential chain-codes. Likewise, the code information 404 may include an ACL, per function, which may include a list of and/or hashes of TCerts of authorized users. User information 402 and validator information 406 may include a key $K_H$, which may be used to encrypt headers and/or code, and one or both of a key pair ($PK_c$, $SK_c$), which may be used to pass messages to contract validators 104. The transaction, $TCert_{uc}$, may be signed by a signature $Sig_{Tcertx}$ 410 of the TCert key of user x. The general information 402 may include a nonce, which may be a random or non-random number added to avoid replay-attacks. A user transaction ID uTID 410, which may be a deterministic function of the transaction, such as a hash, may be used.

Figure 5:
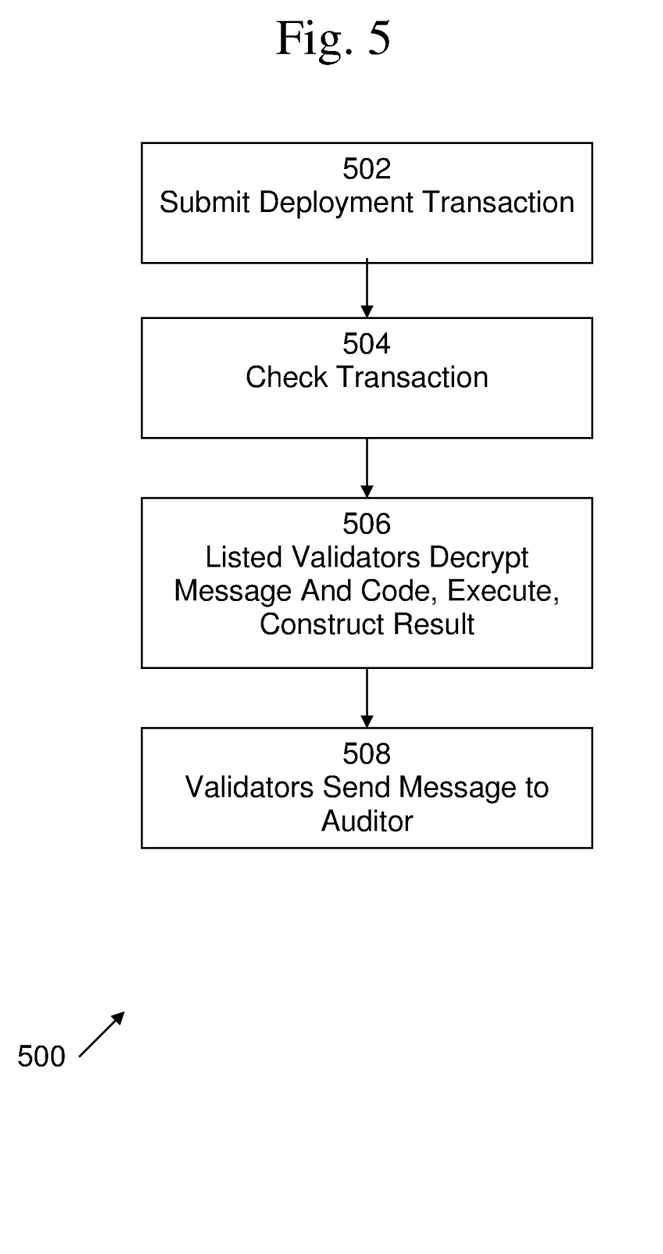
FIG. 5 is a flow diagram of a process in accordance with some exemplary embodiments of the disclosed subject matter.

An example of a process 500 that may be performed after a deployment transaction is issued is shown in FIG. 5. After a deployment transaction is issued, at 502, the user, $u_C$ may submit the deployment transaction to peers (other users 102) and validators 104. At 504, the validators and peers may check the transaction for proper formatting, and give it an order in the total order of transactions, (oTID). At 506, those validators 104 that are in the list of validators may decrypt their message in the transaction, decrypt the code, execute it, if needed, and construct the encrypted result. At 508, validators 104 may add the encrypted result and a message to their auditor in a response to the transaction with reference number oTID, in an encrypted form.

Figure 6:
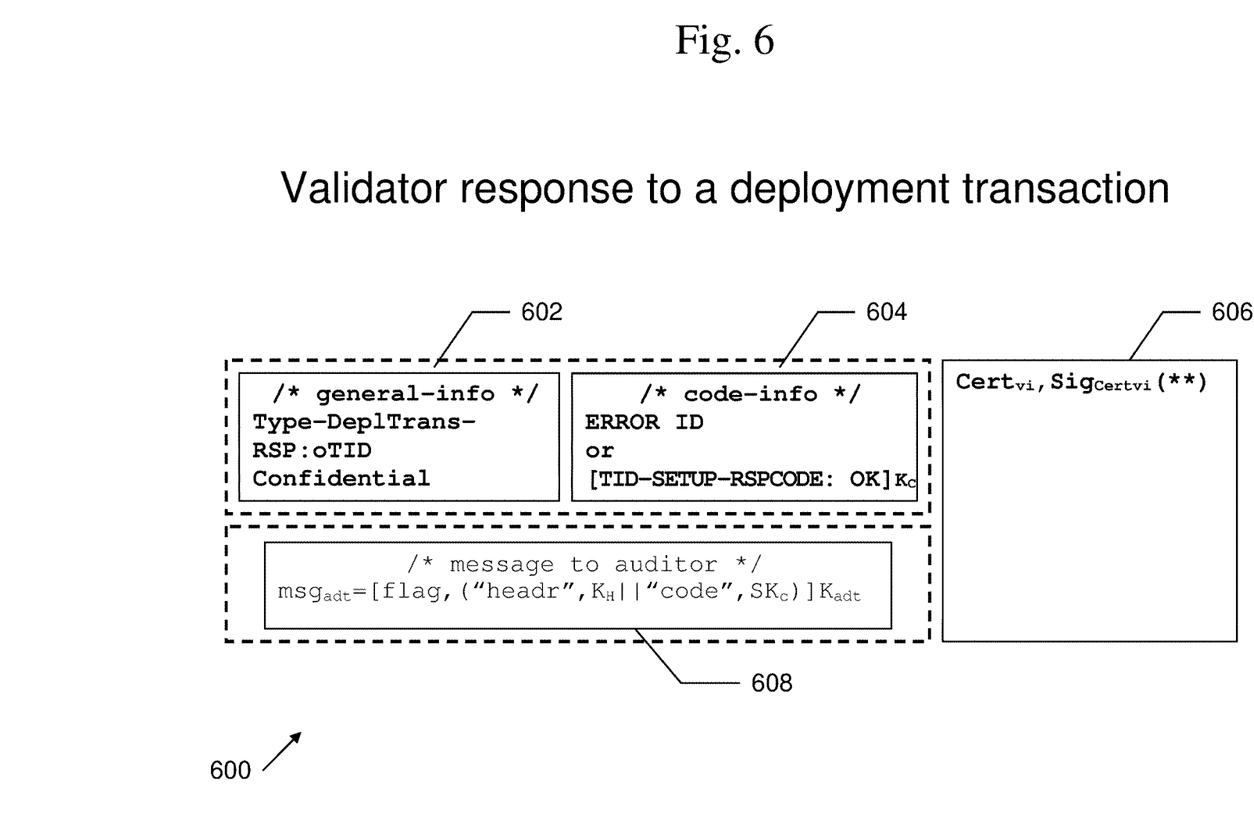
FIG. 6 is an exemplary format of a message that may be used by some exemplary embodiments of the disclosed subject matter.

An exemplary format of a validator response to a deployment transaction 600 is shown in FIG. 6. In this example, response 600 may include general information 602, code information 604, certificate and signature information 606, and a message to the auditor 608. General information 602 may include information such as oTID, the order ID of the corresponding deployment transaction, which may be instantiated, for example, as a hash, and confidentiality information. Code information 604 may include information on the code to be executed, and may include a number of code-functions, such as a response code. Certificate and signature information 606 may include $Sig_{Certvi}$, the signature corresponding to certificate $Cert_{vi}$. Message to the auditor 608 may include $msg_{adt}$, which may contain a message to the auditors with appropriate key material for auditing to take place.

Figure 7:
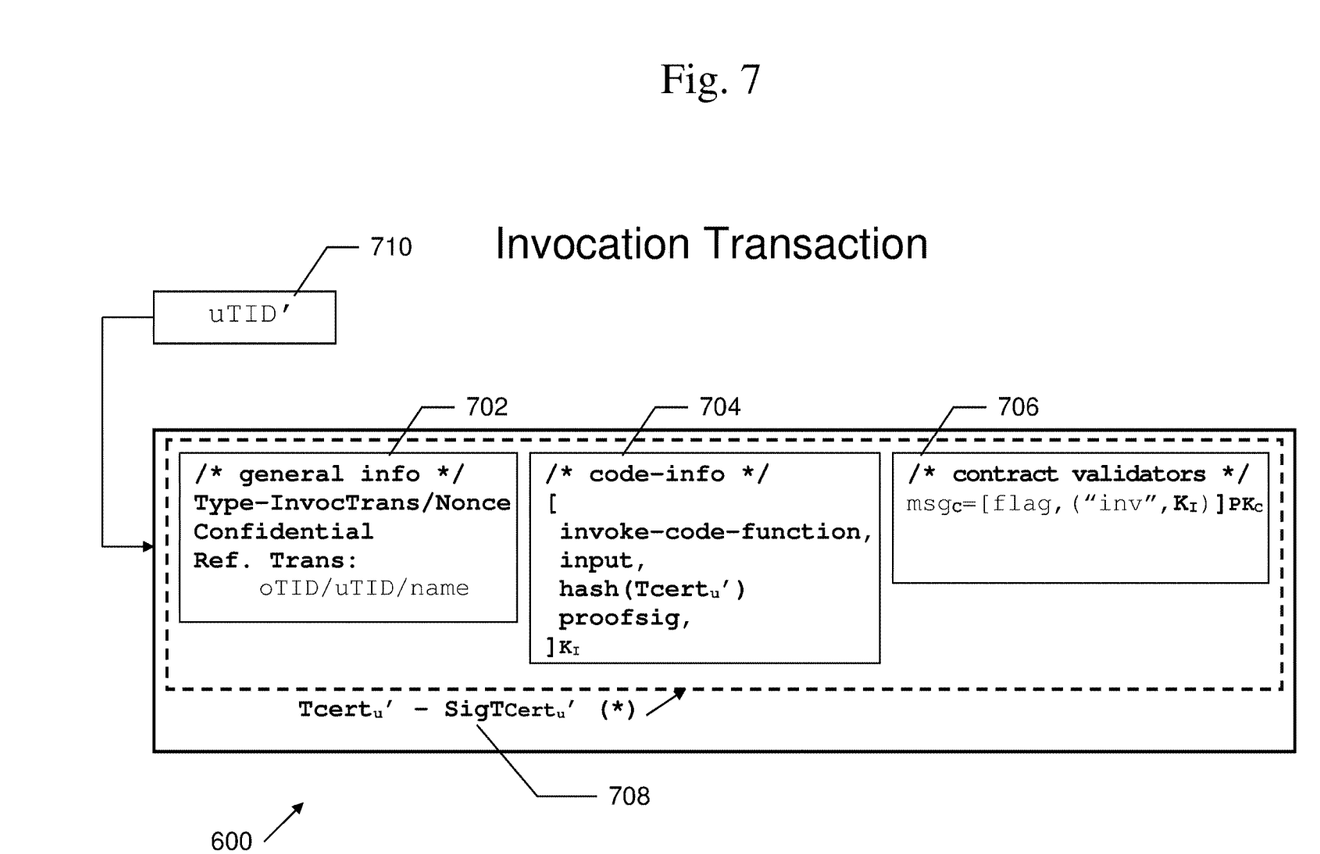
FIG. 7 is an exemplary format of a message that may be used by some exemplary embodiments of the disclosed subject matter.

An exemplary format of an invocation transaction 700 is shown in FIG. 7. In this example, invocation transaction 700 may include general information 702, code information 704, contract validator information 706, certificate and signature information 708, and uTID' 710. General information 702 may include a type of the invocation transaction, a nonce, a confidentiality type, an identification of the reference transaction, such as oTID/TID/name. Code information 704 may include information on the code to be executed, and may include a number of code-functions, a hash of $Tcert_u'$, which may be a random TCert of the invoker u that is not linked to $Tcert_u$, which may be the TCert of the invoker listed in the deployment transaction, and a proofsig, which may be a proof of common ownership of $Tcert_u$ and $Tcert_u'$. Examples of types of proofsigs may include $tsk_u$-$tsk_u'$, which may be a non-transferrable proof, and $Sig_{Tcertu}$ (*), which may be a transferrable proof. Certificate and signature information 706 may include $Tcert_u'$ and $Sig_{TCertu'}$ (*).

Figure 8:
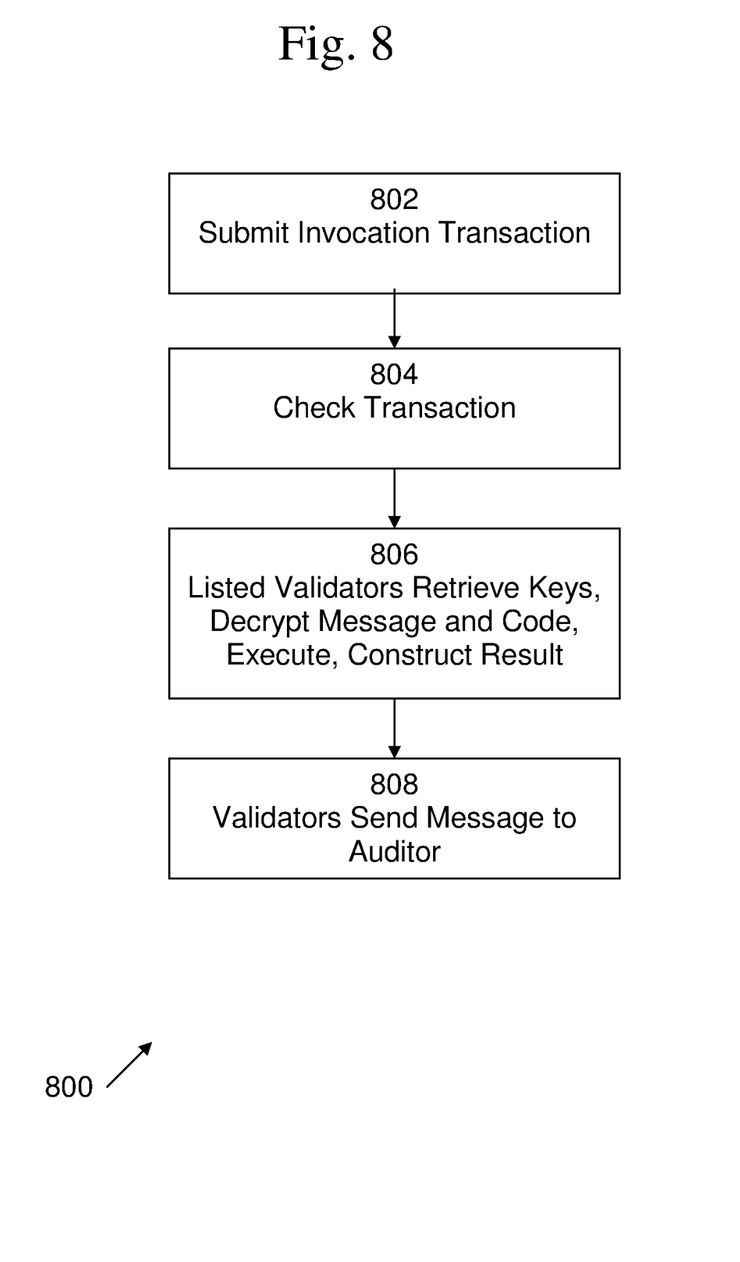
FIG. 8 is a flow diagram of a process in accordance with some exemplary embodiments of the disclosed subject matter.

An example of a process 800 that may be performed after an invocation transaction is issued is shown in FIG. 8. After an invocation transaction is issued, at 802, the user, u, may submit the invocation transaction to transaction to peers (other users 102) and validators 104. At 804, the validators and peers may check that the transaction is properly formed, and give it an order in the total order of transactions, such as oTID'. At 806, those validators 104 that are in the list of validators of the reference transaction may retrieve the corresponding transaction's keys, decrypt their message 508 of FIG. 5, in the invocation transaction, decrypt the code 504 of FIG. 5, execute the code, and construct the encrypted result. At 808, validators 104 may include the encrypted result and message to auditor in a response to the invocation transaction with reference number oTID' and announce it to the network.

Figure 9:
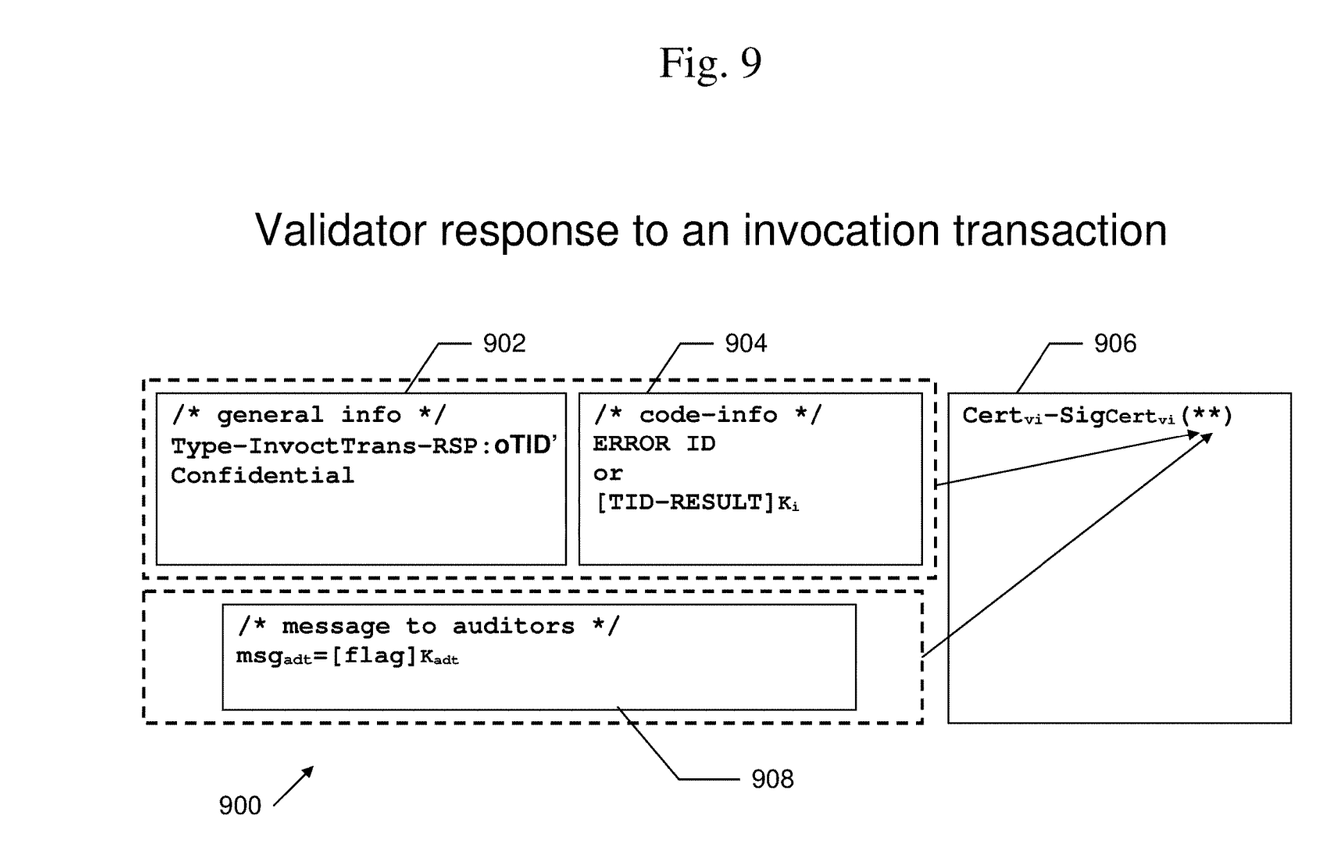
FIG. 9 is an exemplary format of a message that may be used by some exemplary embodiments of the disclosed subject matter.

An exemplary format of a response to an invocation transaction 900 is shown in FIG. 9. In this example, invocation transaction 900 may include general information 902, code information 904, certificate and signature information 906, and message to auditors 908. General information 902 may include a type of the invocation transaction, a nonce, a confidentiality type, an identification of the reference transaction, such as oTID/TID/name. Code information 904 may include information on the code to be executed, and may include a number of code-functions, a hash of $Tcert_u'$, which may be a random TCert of the invoker u that is not linked to $Tcert_u$, which may be the TCert of the invoker listed in the deployment transaction, and a proofsig, which may be a proof of common ownership of $Tcert_u$ and $Tcert_u'$. Examples of types of proofsigs may include $tsk_u$-$tsk_u'$, which may be a non-transferrable proof, and $Sig_{Tcertu}$ (*), which may be a transferrable proof. Certificate and signature information 906 may include $Tcert_u'$ and $Sig_{TCertu'}$ (*).

Figure 10:
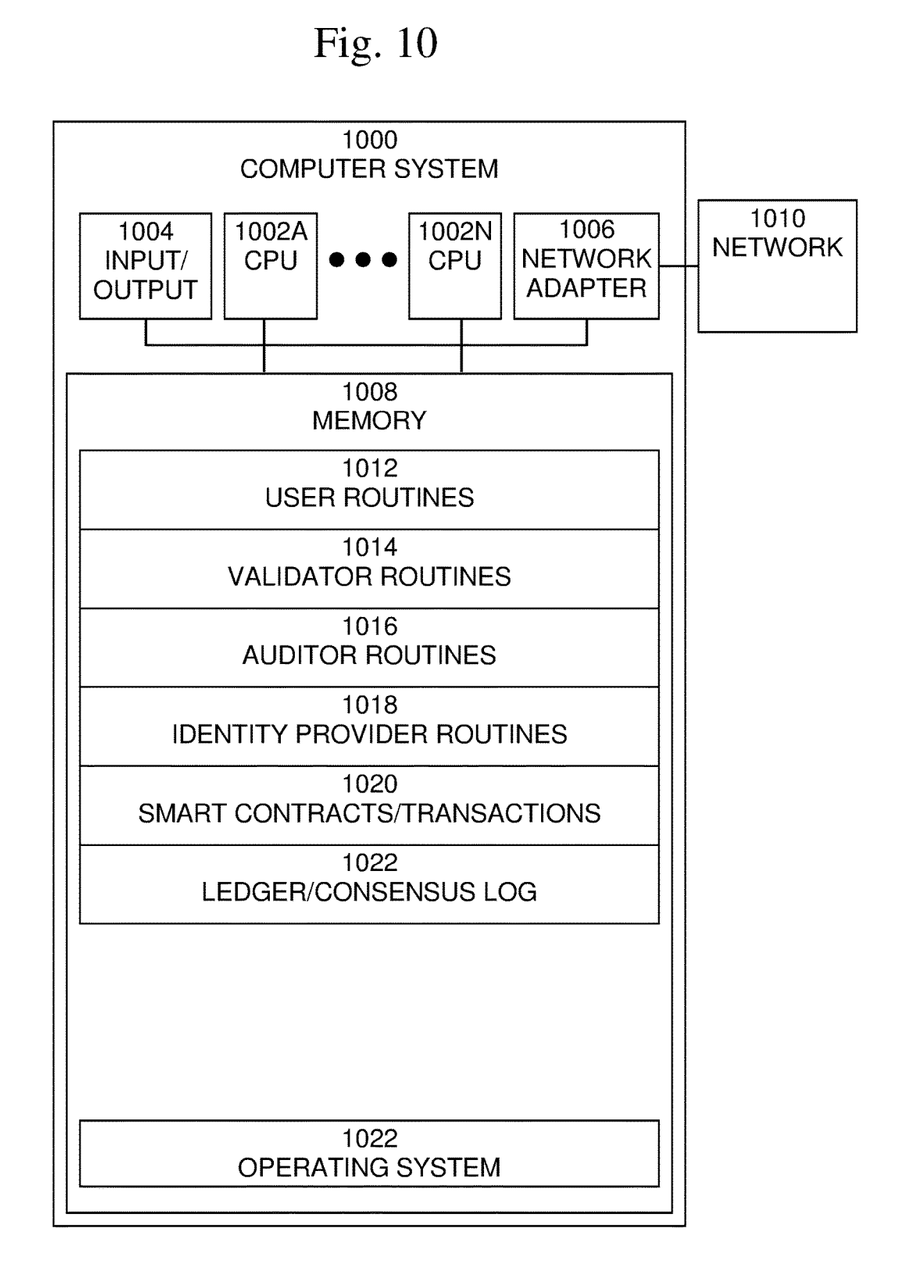
FIG. 10 is a block diagram of a computerized environment in which the disclosed subject matter may be used, in accordance with some exemplary embodiments of the subject matter.

An exemplary block diagram of a computer system 1000, in which processes involved in the embodiments described herein may be implemented, is shown in FIG. 10. Computer system 1000 is typically a programmed general-purpose computer system, such as an embedded processor, system on a chip, personal computer, workstation, server system, and minicomputer or mainframe computer. Computer system 1000 may include one or more processors (CPUs) 1002A-1002N, input/output circuitry 1004, network adapter 1006, and memory 1008. CPUs 1002A-1002N may execute program instructions in order to carry out the functions of the present invention. Typically, CPUs 1002A-1002N may be one or more microprocessors, such as an INTEL PENTIUM® processor. FIG. 10 illustrates an embodiment in which computer system 1000 is implemented as a single multi-processor computer system, in which multiple processors 1002A-1002N share system resources, such as memory 1008, input/output circuitry 1004, and network adapter 1006. However, the present invention also contemplates embodiments in which computer system 1000 is implemented as a plurality of networked computer systems, which may be single-processor computer systems, multi-processor computer systems, or a mix thereof.

Input/output circuitry 1004 provides the capability to input data to, or output data from, computer system 1000. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1006 interfaces device 1000 with a network 1010. Network 1010 may be any public or proprietary LAN or WAN, including, but not limited to the Internet.

Memory 1008 stores program instructions that are executed by, and data that are used and processed by, CPU 1002 to perform the functions of computer system 1000. Memory 1008 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1008 vary depending upon the function that computer system 1000 is programmed to perform. For example, as shown in FIG. 1, computer systems may perform a variety of roles in the system, method, and computer program product described herein. For example, computer systems may perform one or more roles as users, validators, auditors, and/or identity providers. In the example shown in FIG. 10, exemplary memory contents are shown representing routines for all of these roles. However, one of skill in the art would recognize that these routines, along with the memory contents related to those routines, may be included on one system, or may be distributed among a plurality of systems, based on well-known engineering considerations. The present invention contemplates any and all such arrangements.

In the example shown in FIG. 10, memory 1008 may include user routines 1010, validator routines 1012, certificate authority routines 1014, transaction data 1016, and operating system 1024. User routines 1010 may include routines to implement functions utilized by end-user computer systems, such as initiating and processing transactions, generating and/or storing transaction data 1016, etc. Validator routines 1012 may include routines to implement functions utilized by validator computer systems, such as verifying and processing transactions, generating and/or storing transaction data 1016, generating result information, etc. Certificate authority routines 1016 may include routines to implement functions utilized by certificate authority computer systems, such as generating certificates, etc. Operating system 1024 provides overall system functionality.

As shown in FIG. 10, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for communication in a blockchain network of computer systems, the method comprising:
   at a user computer system of the blockchain network of computer systems:
      generating a security value that is to be used only once;
      generating a transaction signed with a security certificate and including the security value, wherein the transaction indicates a group of validator computer systems of the blockchain network of computer systems that is eligible to execute the transaction; and
      transmitting the transaction over the blockchain network of computer systems; and
   at a validator computer system of the group of validator computer systems of the blockchain network of computer systems:
      submitting a vote for the transaction that indicates whether the validator computer system has validated the transaction; and
      adding a sequence number of the transaction to the transaction,
      wherein one or more other validator computer systems in the group of validator computer systems of the blockchain network of computer systems considers whether the transaction is valid if and only if the sequence number indicates that the transaction is more recent than other transactions being considered for validation by the one or more other validator computer systems.

2. The method of claim 1, wherein the security certificate includes information identifying the user computer system and the security value is generated as a function of a security value included in a previous message.

3. The method of claim 2, wherein the function used to generate the security value is selected from a group including a counter function, a hash function, and a random function.

4. The method of claim 2, wherein the transaction further comprises computer program instructions to be executed to perform at least one function relating to a digital transaction, the method further comprising:

at the validator computer system:
  executing the digital transaction by executing the computer program instructions to perform the at least one function relating to the digital transaction; and
  storing information relating to the executed digital transaction in an order in which the digital transactions were performed.

5. The method of claim 4, wherein the information relating to the executed digital transaction comprises a security value included in a digital transaction for each of a plurality of user systems.

6. The method of claim 1, wherein the security certificate does not include information identifying the user computer system, the security certificate has a validity period, and the security value is generated as a random function.

7. The method of claim 6, wherein the transaction further comprises computer program instructions to be executed to perform at least one function relating to a digital transaction, the method further comprising:
at the validator computer system:
  executing the digital transaction by executing the computer program instructions to perform the at least one function relating to the digital transaction; and
  storing information relating to the executed digital transaction including a hash of the security value.

8. The method of claim 7, further comprising:
resetting the hash of the security value upon expiration of the validity period of the security certificate.

9. A blockchain network of computer systems comprising:
a user computer system and a group of validator computer systems, wherein the user computer system comprises a first processor and a first memory storing computer program instructions, the first processor configured to access the first memory and execute the computer program instructions stored in the first memory to:
generate a security value that is to be used only once;
generate a transaction signed with a security certificate and including the security value, wherein the transaction indicates that the group of validator computer systems of the blockchain network of computer systems is eligible to execute the transaction; and
transmit the transaction over the blockchain network of computer systems, and
wherein a validator computer system of the group of validator computer systems of the blockchain network of computer systems comprises a second processor and a second memory storing computer program instructions, the second processor configured to access the second memory and execute the computer program instructions stored in the second memory to:
  submit a vote for the transaction that indicates whether the validator computer system has validated the transaction; and
  add a sequence number of the transaction to the transaction,
  wherein one or more other validator computer systems in the group of validator computer systems of the blockchain network of computer systems considers whether the transaction is valid if and only if the sequence number indicates that the transaction is more recent than other transactions being considered for validation by the one or more other validator computer systems.

10. The blockchain network of computer systems of claim 9, wherein the security certificate includes information identifying the user computer system and the security value is generated as a function of a security value included in a previous message.

11. The blockchain network of computer systems of claim 10, wherein the function used to generate the security value is selected from a group including a counter function, a hash function, and a random function.

12. The blockchain network of computer systems of claim 10, wherein the transaction further comprises computer program instructions to be executed to perform at least one function relating to a digital transaction and the second memory of the validator computer system further comprises computer program instructions executable by the second processor of the validator computer system to:
  execute the digital transaction by executing the computer program instructions to perform the at least one function relating to the digital transaction; and
  store information relating to the executed digital transaction in an order in which the digital transactions were performed.

13. The blockchain network of computer systems of claim 12, wherein the information relating to the executed digital transaction comprises a security value included in a digital transaction for each of a plurality of user systems.

14. The blockchain network of computer systems of claim 9, wherein the security certificate does not include information identifying the user computer system, the security certificate has a validity period, and the security value is generated as a random function.

15. The blockchain network of computer systems of claim 14, wherein the transaction further comprises computer program instructions to be executed to perform at least one function relating to a digital transaction and the second memory of the validator computer system further comprises computer program instructions executable by the second processor of the validator computer system to:
  execute the digital transaction by executing the computer program instructions to perform the at least one function relating to the digital transaction; and
  store information relating to the executed digital transaction including a hash of the security value.

16. The blockchain network of computer systems of claim 15, wherein the first memory of the user computer system further comprises computer program instructions executable by the first processor of the user computer system to:
  reset the hash of the security value upon expiration of the validity period of the security certificate.

17. A computer program product for communicating in a blockchain network of computer systems comprising a user computer system and a group of validator computer systems, the computer program product comprising a non-transitory computer readable medium and computer program instructions stored on the computer readable medium and executable by a processor to perform at the user computer system:
  generating a security value that is to be used only once;
  generating a transaction signed with a security certificate and including the security value, wherein the transaction indicates that the group of validator computer systems of the blockchain network of computer systems is eligible to execute the transaction; and
  transmitting the transaction over the blockchain network of computer systems,
  the computer program instructions being further executable by the processor to perform at a validator computer system of the group of validator computer systems of the blockchain network of computer systems:

submitting a vote for the transaction that indicates whether the validator computer system has validated the transaction; and adding a sequence number of the transaction to the transaction, wherein one or more other validator computer systems in the group of validator computer systems of the blockchain network of computer systems considers whether the transaction is valid if and only if the sequence number indicates that the transaction is more recent than other transactions being considered for validation by the one or more other validator computer systems.

18. The computer program product of claim 17, wherein the security certificate includes information identifying the user computer system and the security value is generated as a function of a security value included in a previous message.

19. The computer program product of claim 18, wherein the function used to generate the security value is selected from a group including a counter function, a hash function, and a random function.

20. The computer program product of claim 18, wherein the transaction further comprises computer program instructions to be executed to perform at least one function relating to a digital transaction, the computer program instructions being further executable by the processor to perform at the validator computer system:

executing the digital transaction by executing the computer program instructions to perform the at least one function relating to the digital transaction; and storing information relating to the executed digital transaction in an order in which the digital transactions were performed.

21. The computer program product of claim 20, wherein the information relating to the executed digital transaction comprises a security value included in a digital transaction for each of a plurality of user systems.

22. The computer program product of claim 17, wherein the security certificate does not include information identifying the user computer system, the security certificate has a validity period, and the security value is generated as a random function.

23. The computer program product of claim 22, wherein the transaction further comprises computer program instructions to be executed to perform at least one function relating to a digital transaction, the computer program instructions being further executable by the processor to perform at the validator computer system:

executing the digital transaction by executing the computer program instructions to perform the at least one function relating to the digital transaction; and storing information relating to the executed digital transaction including a hash of the security value.

24. The computer program product of claim 23, the computer program instructions being further executable by the processor to perform at the user computer system:

resetting the hash of the security value upon expiration of the validity period of the security certificate.

* * * * *